July 12, 1966  K. ASTON  3,260,152
COLOR PRINTING APPARATUS
Filed March 26, 1962  2 Sheets-Sheet 1
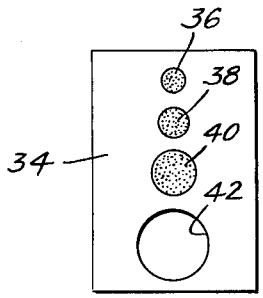
Fig. 3
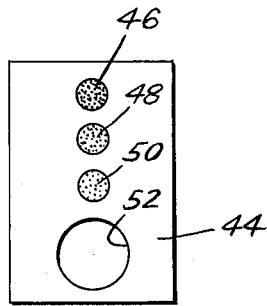
Fig. 4
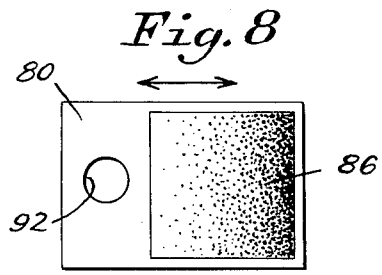
Fig. 8
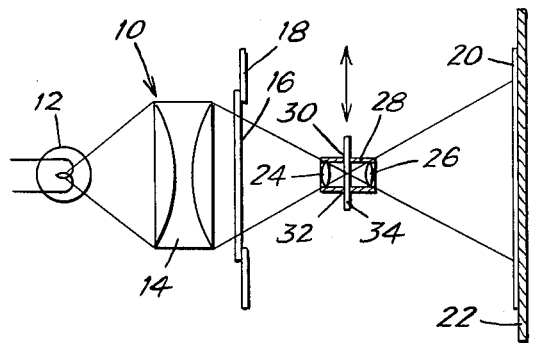
Fig. 1
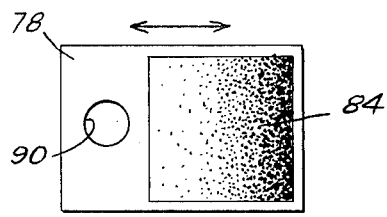
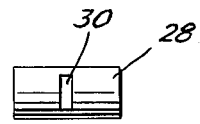
Fig. 2
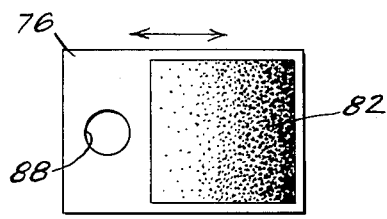
INVENTOR
Keith Aston,
BY Diggins + LeBlanc
ATTORNEYS July 12, 1966  K. ASTON  3,260,152
COLOR PRINTING APPARATUS
Filed March 26, 1962  2 Sheets—Sheet 2

INVENTOR
Keith Aston,
BY Diggins & LeBlanc
ATTORNEYS

United States Patent Office 3,260,152
Patented July 12, 1966

3,260,152
COLOR PRINTING APPARATUS
Keith Aston, Epsom, Surrey, England, assignor to The Pavelle Corporation, New York, N.Y., a corporation of New York
Filed Mar. 26, 1962, Ser. No. 182,580
15 Claims. (Cl. 88—24)

This invention relates to color printers and more particularly to apparatus for making enlarged color prints from color negatives or transparencies.

Color printing can be carried out by the additive process in which separate exposures are made for each component color image of the negative or by the subtractive process in which a single exposure is made with color corrected light. In the former process a single filter is required corresponding to each component color of the negative. In the latter process a set of color correction filters is required to enable a color correction to be made appropriate to the negative to be printed.

Heretofore the color filters for color printing have, in use, been positioned either between the negative and the light source or alternatively on the end of the objective or projection lens mount. With either arrangement and particularly the former, the area of the filters is unavoidably quite large. As a result, earlier constructions have been subject to inaccuracies resulting from unavoidable variations in filter density over the area of the filters.

The present invention overcomes, to a large extent, the problems resulting from less than perfect uniformity in filter construction by providing apparatus for making enlarged prints and the like wherein the color filters or correction filters are placed as near as possible to the lens stop of the printer. This arrangement makes possible a significant reduction in the area of the filters since the filter is situated where the light beam is of a relatively small cross-sectional size. Furthermore, when the filters are positioned adjacent the lens stop rather than adjacent the negative minor variations in filter uniformity are automatically integrated by the printer to produce a uniform filtered light.

It is therefore a primary object of the present invention to provide a novel color printer.

Another object of the present invention is to provide a novel printing apparatus for making enlarged color prints from negatives or transparencies.

Another object of the present invention is to provide a novel lens stop for color printers.

Another object of the present invention is to provide a combined lens and filter unit for color printers.

These and further objects and advantages of the invention will be more apparent upon reference to the following specifications, claims and appended drawings wherein:

FIGURE 1 is a diagrammatic showing of a novel printer constructed in accordance with the present invention.

FIGURE 2 is a plan view of the tubular lens holder of FIGURE 1.

FIGURE 3 shows a combination filter and lens stop usable in the printer of FIGURE 1.

FIGURE 4 shows a modified combination filter and lens stop usable in the printer of FIGURE 1.

FIGURE 8 is a detailed showing of the correction filters employed in the printer of FIGURE 5.

Figure 5:
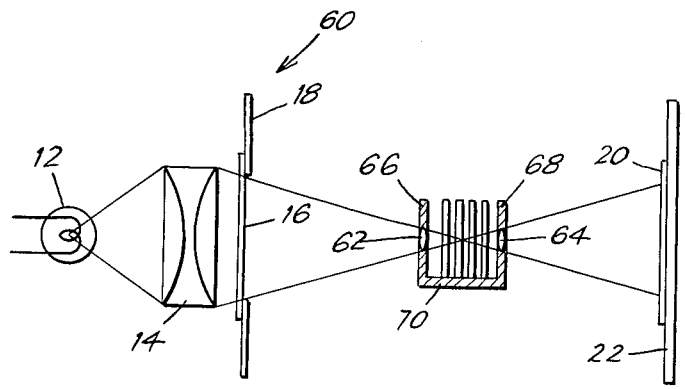
FIGURE 5 is a diagrammatic showing of a modified printer constructed in accordance with the present invention.
Figure 6:
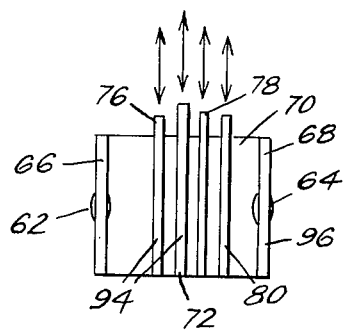
FIGURE 6 is a plan view of the combination lens and filter unit of FIGURE 5.
Figure 7:
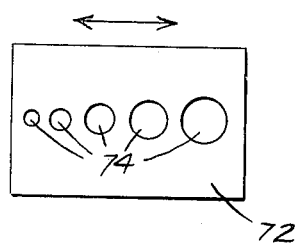
FIGURE 7 shows a lens stop usable in the printer of FIGURE 5.

Referring to the drawings, FIGURE 1 is a diagrammatic side view of a novel additive type printer constructed in accordance with the present invention generally indicated at 10, comprising a lamp 12, and a condenser 14; passing light through a negative 16 supported on negative carrier 18 to a print 20 supported by easel 22. Positioned between negative 16 and print 20 is a double element objective or focusing lens comprising lens elements 24 and 26 spaced apart and mounted in opposite ends of a tubular casing or lens holder 28. Holder 28 (as best seen in FIGURE 2) is provided with aligned slots such as 30 and 32 through which is slidably received a plate-like filter carrier 34.

As best seen in FIGURE 3 filter carrier 34 is a plate-like member having three spaced circular apertures of increasing diameters from one end to the other. In the first and smallest aperture is mounted a red filter 36, in the second and slightly larger aperture a green filter 38 and in the third and largest aperture a blue filter 40. The filter carrier 34 is selectively movable as indicated by the double ended arrow in FIGURE 1 into three positions in which the three filters are respectively positioned in the light path through the lens elements 24 and 26. The filters 36, 38 and 40 serve as lens stops when in use and the different sizes thereof are chosen to balance the exposure times therethrough, i.e., to counterbalance the difference in sensitivity of the printing paper to light of its component colors.

In the preferred embodiment filter carrier 34 is provided with a fourth clear aperture 42 positionable in the light path to enable the printer of FIGURE 1 to be used for the production of black and white prints.

FIGURE 4 shows a modified filter carrier 44 which may be used in the printer of FIGURE 1 in place of filter carrier 34. Instead of the three filters being of different size, the three filters 46, 48 and 50 in the filter carrier 44 are all of equal size and the required balance of exposure times is obtained by having each of the filters of different density. Alternatively, the filters 46, 48 and 50 may be of equal density and the exposure time balance obtained by varying the light intensity of lamp 12 so that the lamp intensity is different for each of the filters. Filter carrier 44 is likewise preferably provided with a clear aperture 52 for black and white printing.

FIGURE 5 shows a diagrammatic side view of a second embodiment of the printer of the present invention for use in the production of color enlargements by a subtractive printing process. In this embodiment, like parts bear like reference numerals and the printer, generally indicated at 60 in FIGURE 5, includes the light source 12 and condenser 14 passing light through negative 16 mounted on negative holder 18 to print 20 carried by easel 22. Positioned between the negative 16 and print 20 is a combined lens and filter unit including focussing lens elements 62 and 64. The lens elements 62 and 64 are mounted in the opposite walls 66 and 68 of a channel-shaped casing or holder 70.

Slidably received within the holder 70 is a stop plate 72 provided with a plurality of apertures or lens stops 74 of different diameter. Also mounted for rectilinear movement in planes parallel to the plane of a lens stop plate 72 are three color correction filter carriers, 76, 78 and 80. Mounted on carriers 76, 78 and 80 are continuous wedge filters 82, 84 and 86 of varying density, being most dense at the right-hand end of the filters as illustrated in FIGURE 8. One of the filter wedges such as 82 is formed of cyan dye, the second wedge such as 84 of magenta dye and the third wedge such as 86 of a yellow dye. The dyes are preferably formed on 35 mm. film and mounted in suitable apertures in each of these carriers 76, 78 and 80.

One of the filter carriers such as filter carrier 76 is mounted to one side of the stop-plate 72 between the stop plate and the lens element 62 and the other two correction filter carriers 78 and 80 are mounted on the other side of stop-plate 72. All of the correction filter carriers 76, 78 and 80 are mounted as close as possible to the stop-plate.

With the arrangement shown in FIGURES 5 through 8 each correction filter is independently positionable in the light path of the lens for exposure through any desired portion thereof. An exposure can thus be made simultaneously through desired portions of all three filters although in normal use only two filters are needed to achieve the required color correction for any particular negative. Preferably each correction filter carrier includes an open aperture 88, 90 and 92 positionable in the light path when the particular filter of that carrier is not required. This enables all three filters to be put out of use for black and white printing. If desired, suitable indicia such as 94 may be placed along the upper longitudinal edges of the correction filter carriers and the stop-plate 72 so as to be positionable with respect to similar indicia 96 along the upper edge of wall 68 of holder 70.

It is apparent from the above that the present invention provides a novel printing construction both for additive and subtractive type processes. In each instance the filter elements are placed as close as possible to the lens stop and it is apparent that, if desired, the filter elements may in each case do double duty both as filters and as lens stops. In this position the light beam diameter is a minimum so that variations in filter uniformity across the area of the filter intercepted by the light beam is minimized. Furthermore, by placing the filters close to the light stop any variations or nonuniformity of the filter are automatically integrated by the printer so as to provide a uniform light to the print or emulsion carrier 20.

While shown in conjunction with multiple lens constructions, it is apparent that the present invention can be utilized in conjunction with a single element objective lens. When only a single lens is utilized the filters are again placed as close to the lens stop as possible or form the lens stop themselves. With the single lens element it is preferred that the single filter as shown in FIGURE 1 be placed on the side of the single lens element remote from the light source 12. It is further apparent that rather than reciprocating filters the present invention comprehends the use of a rotatably mounted filter carrier plate or plates. Likewise in some instances it may be desirable to replace the lens stop plate 72 of FIGURE 6 with a conventional variable iris lens stop. Also, although the lens and filter constructions have been shown in the preferred forms as combined into a single combination lens and filter unit it is apparent that the parts comprising the lens elements, stops and filters can be separately mounted in the printing apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. A color printer comprising a light source providing a light beam directed through a color negative supported on a negative carrier onto an easel, lens means intermediate said color negative and said easel, said light beam having a nodal point formed by said lens means between said color negative and said easel, and filter means mounted closely adjacent said lens means at the nodal point of said light beam so as to be operable within a minimal cross-section of the light beam from said light source.

2. A printer according to claim 1 wherein said filter means includes a lens stop for said printer.

3. A color printer comprising a negative carrier for supporting a color negative and an easel for supporting an emulsion carrier, a light source providing a light beam directed through said color negative on said negative carrier onto an emulsion carrier on said easel, and leans means intermediate the carrier and said easel, said light beam having a nodal point formed by said lens means between said carrier and said easel, said lens means including at least one color filter and a lens stop mounted at the nodal point of said light beam so as to be operable within a minimal cross-section of the light beam from said light source.

4. A printer according to claim 3 wherein said color filters are combined as a single unit.

5. A color printer comprising the series combination of a light source, a color negative mounted in a negative carrier, an easel, and lens means including at least one lens element between said negative carrier and said easel, said light source providing a light beam directed through said color negative mounted in said negative carrier onto said easel, said light beam having a nodal point formed by said lens means between said carrier and said easel, said lens means including at least one color filter and a lens stop mounted on the side of said element remote from said light source at the nodal point of said light beam so as to be operable within a minimal cross-section of the light beam from said light source.

6. A printer according to claim 5 wherein said lens means includes a set of additive color filters.

7. A printer according to claim 5 wherein said lens means includes a set of color correction filters for subtractive printing.

8. A printer according to claim 5 wherein said filter and lens stop is movable in a plane perpendicular to the path of light from said light source.

9. A printer according to claim 8 wherein the filter and lens stop comprises a plate on which are mounted additive color filters of different density.

10. A printer according to claim 8 wherein said filter and lens stop is mounted in a common tubular holder, said filter and lens stop being slidable through aligned slots in opposite sides of said holder.

11. A color printer comprising the series combination of a light source, a color negative mounted in a negative carrier, and an easel, lens means including at least one lens element positioned between said color negative mounted in said negative carrier and said easel, said light source providing a light beam directed through said color negative onto said easel, said light beam having a nodal point formed by said lens means between said color negative and said easel, a lens stop and a series of correction filters positionable in the path of said light beam mounted adjacent said lens element at the nodal point of said light beam so as to be operable within a minimal cross-section of the light beam from said light source.

12. A printer according to claim 11 wherein said correction filters comprise variable density color wedges.

13. A printer according to claim 12 wherein said correction filters include a cyan wedge, a magenta wedge and a yellow wedge.

14. A printer according to claim 13 wherein said correction filters are made of dyed transparent film mounted on filter carriers movable in planes perpendicular to said path of light.

15. A printer according to claim 14 wherein said lens element, said lens stop and said filter carriers are all mounted in a common channel shaped holder.

References Cited by the Examiner

UNITED STATES PATENTS

| | | | |
|---|---|---|---|
| 1,268,577 | 6/1918 | Jones. | |
| 2,015,261 | 9/1935 | Eckler | 95—64 |
| 2,135,506 | 11/1938 | Hansch et al. | 95—64 |
| 2,135,507 | 11/1938 | Hansch et al. | 95—64 |
| 2,335,189 | 11/1943 | Mayer | 95—64 X |
| 2,380,216 | 7/1945 | Carter | 88—113 X |
| 2,641,952 | 6/1953 | Mellert | 88—113 X |
| 2,841,065 | 7/1958 | Gage et al. | 88—112 X |
| 2,999,443 | 9/1961 | Miyauchi. | |

FOREIGN PATENTS 435,115   5/1948   Italy.

NORTON ANSHER, *Primary Examiner.*

EMIL G. ANDERSON, *Examiner.*

R. A. WINTERCORN, *Assistant Examiner.*